United States Patent
Smith et al.

(10) Patent No.: US 6,206,616 B1
(45) Date of Patent: Mar. 27, 2001

(54) TOOL AND METHOD FOR CUTTING A CIRCULAR OPENING AND RETAINING THE CUT PORTION

(75) Inventors: Garrett E. J. Smith; Randall T. Hooper, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/138,726

(22) Filed: Aug. 24, 1998

(51) Int. Cl.[7] .............. B23B 35/00; B23B 51/00; B23B 51/04
(52) U.S. Cl. ............... 408/1 R; 408/67; 408/80; 408/201; 408/204; 408/206; 408/208; 408/190; 408/193
(58) Field of Search .................. 408/67, 68, 80, 408/79, 201, 204, 206, 208, 207, 209, 225, 189, 190, 193, 194, 81, 214, 196; 137/318; 451/460, 545

(56) References Cited

U.S. PATENT DOCUMENTS

| | | | |
|---|---|---|---|
| 49,336 | * | 8/1865 | Brodhead ............... 408/196 |
| 115,587 | * | 6/1871 | Dorn ................... 408/190 |
| 458,091 | * | 8/1891 | Beauchene ............. 408/190 |
| 1,441,994 | * | 1/1923 | Mueller ................ 408/206 |
| 1,955,768 | * | 4/1934 | Powell ................. 408/67 |
| 2,050,985 | * | 8/1936 | Trickey ................ 408/92 |
| 2,941,427 | * | 6/1960 | Nooy ................... 408/67 |
| 3,227,012 | * | 1/1966 | Lemelson ............... 408/67 |
| 3,349,792 | * | 10/1967 | Larkin ................. 408/67 |
| 3,976,091 | * | 8/1976 | Hutton ................. 408/92 |

(List continued on next page.)

FOREIGN PATENT DOCUMENTS

| | | | |
|---|---|---|---|
| 282475 | * | 3/1915 | (DE) .................. 408/206 |
| 392663 | * | 3/1924 | (DE) .................. 408/230 |

OTHER PUBLICATIONS

Saws, Blades & Bits: Hole Cutting Saws, downloaded from www.pascospecialty.com on Jun. 11, 1998, 1 sheet.
Tools Plus, Inc., "Hole Saws & Kits," downloaded from www.toolsplus.com on Jun. 11, 1998, on 4 sheets.
Two black and white images of drill bits downloaded from www.rigid.com on Jun. 11, 1998, 2 sheets.
"Tool Dictionary: Hole Saw," downloaded from www.homecentroal.com on Jun. 11, 1998, 1 sheet.

(List continued on next page.)

Primary Examiner—Daniel W. Howell
(74) Attorney, Agent, or Firm—Kevin L. Dollar; Conley, Rose & Tayon

(57) ABSTRACT

A tool and method for cutting a circular opening and retaining the cut portion. The tool comprises a shaft having at least one cutting thread and at least one tapping thread, or at least one cutting thread and at least one male screw thread, or only at least one tapping thread, or only at least one male screw thread, or a cutting tip and at least one tapping thread, or a cutting tip and at least one male screw thread, and a cutting member having at least one cutting bit radially displaced from the shaft. The shaft and the cutting member have a mutual rotational axis. An alternative tool has a spaced distance on the shaft between the cutting member and the at least one cutting thread and at least one tapping thread, or the at least one cutting thread and at least one male screw thread, or the at least one tapping thread, or the at least one male screw thread, or the cutting tip and at least one tapping thread, or the cutting tip and at least one male screw thread. The tool is either one integral piece or it is assembled from at least two separate pieces adapted to fit together. The at least one cutting bit can be saw teeth or grit particles. A method of using the tool by inserting the shaft into an existing pilot hole or drilling a pilot hole, and by maintaining the shaft within the pilot hole while cutting the circular opening.

52 Claims, 12 Drawing Sheets

U.S. PATENT DOCUMENTS

| | | | | |
|---|---|---|---|---|
| 4,116,578 | * | 9/1978 | Gelfand et al. | 408/225 |
| 4,536,107 | * | 8/1985 | Sandy et al. | 408/225 |
| 5,562,371 | * | 10/1996 | Reed | 408/225 |
| 5,573,537 | * | 11/1996 | Rogozinski | 408/225 |
| 5,810,523 | * | 9/1998 | Miyanaga | 408/225 |
| 5,893,686 | * | 4/1999 | Weiler | 408/97 |

OTHER PUBLICATIONS

Various descriptions and depictions of hole saw sets downloaded from www.wolfcraft.com on Jun. 11, 1998, 2 sheets.

"Working with Plexiglass," downloaded from www.randyfromm.com on Jun. 11, 1998, 3 sheets.

Widell Industries Thread Cutting Terms Pages, Widell Industries Tap Terms downloaded from www.widell.com on Jun. 30, 1998, 10 sheets.

Price sheet for "Single Point Tools with Carboloy* Carbide," published by Carboloy Inc., dated Oct. 30, 1995, 1 sheet.

K & W Tools Co., Ltd., "Wood Working Hole Saw," downloaded from www.kw.tools.com on Jun. 30, 1998, 2 sheets.

"Carbide Tipped Hole Saws," and "Carbide Tipped Hole Saw Kits," by Lenox–Carbide Tipped Hole Saw, downloaded from www.lenoxsaw.com on Jun. 11, 1998, 3 sheets.

* cited by examiner

TOOL AND METHOD FOR CUTTING A CIRCULAR OPENING AND RETAINING THE CUT PORTION

BACKGROUND OF THE INVENTION

1. Field of the Invention

This invention relates to a tool for cutting a circular opening in a workpiece and maintaining control of the cut portion after cutting the circular opening.

2. Description of the Related Art

Circular openings and large holes are often needed in various workpieces, such as walls, plates, piping, and containers. A large drill bit could be used to cut the circular opening. However, large drill bits can be expensive and heavy. Also, it can be difficult to control the lateral location precision when using a large drill bit in a hand-stabilized drilling tool, such as an electric-powered hand drill. As an alternative to large drill bits, hole-saws are often used. Furthermore, using a drill bit to create a circular opening uses much more energy and requires a greater amount of torque and force since it cuts most all of the area corresponding to the circular opening, whereas a hole-saw cuts much less area (mainly the outer diameter of the circular opening) to create the same size hole.

Hole-saws currently exist in many configurations and designs. A hole-saw typically has a cylindrical shaped blade comprising cutting bits (e.g., saw teeth, hard grit particles) located circumferentially around its edge corresponding to the diameter of the desired circular opening. Hole-saws often have pilot shafts to enable the tool operator to align the center-point of the hole-saw blade with the desired center-point of the circular opening. The hole-saw pilot shaft can be inserted into a pilot hole corresponding to the center-point of the desired circular opening to stabilize the lateral location of the hole-saw blade and to create a more precise and cleaner circular opening cut. A pilot hole can be created, for example, using a separate tool (e.g., metal drill bit, wood auger, hole punch), or by the hole-saw's pilot shaft itself when the tip of the pilot shaft penetrates to form an opening Hole-saws often come in kits having interchangeable hole-saw blade diameters that fit on a common drill arbor, where the drill arbor has a pilot shaft extending from it along the rotational axis and within the center of the hole-saw blade. The range of holesaw diameters in a kit is often in increments of standard sizes corresponding to the standard piping and conduit sizes for which the circular openings are often needed (e.g., plumbing, electrical wiring conduit routing).

Another alternative for cutting large circular openings is a circle cutter. A circle cutter typically has a single cutting bit or blade that rotates about a pilot shaft at a radius corresponding to the desired circular opening. The cutting bit is often removable and interchangeable for replacing worn bits or substituting a different bit type corresponding to the workpiece material. A circle cutter almost universally has an adjustable radial position for the single bit, which allows the same blade to cut a wide range of circular opening diameters. When using a hand-held drilling tool, it is essential for a circle cutter to have a pilot shaft. Much like the hole-saw, a circle cutter's pilot shaft can either be inserted into an existing hole created by a separate tool, or the pilot shaft itself can create the hole with its tip having a means for creating a pilot hole. When a circle cutter is held in a fixed machine while cutting the circular opening (e.g., end mill, lathe), the pilot shaft may not be as essential because the machine may provide enough stability for lateral location precision and alignment of the circle cutter.

Both hole-saws and circle cutters are often adapted to allow adjustable pilot shaft lengths. A longer pilot shaft may be easier to use because it can slide into the pilot hole and completely through the workpiece while providing the tool operator time during insertion to stabilize and ensure that the rotational axis of the hole-saw blade or circle cutter bit is normal to the workpiece. But, sometimes physical restrictions on the inside of the workpiece prevent the use of a longer pilot shaft that extends deep within workpiece while cutting the circular opening, which would make a short pilot shaft of a particular length more applicable. Hole-saws and circle cutters can also have interchangeable pilot shafts to allow the insertion of a variety of pilot shaft lengths and pilot shaft types (e.g., cutting thread tip, point tip, auger tip) to correspond to an array of workpiece physical restrictions and materials.

One of the major problems with existing hole-saws and circle cutters is that after the circular opening is cut, the cut portion is not controlled. Because the pilot shaft of conventional hole-saws and circle cutters can slide in and out of the pilot hole with or without pilot shaft rotation after a pilot hole is formed, the cut portion can freely slide off of the end of the pilot shaft. There are many applications where it is critical to maintain control of the cut portion to prevent it from falling into unwanted places where it can cause damage to things that it lands on or where it cannot be retrieved easily.

One example where it is critical to maintain control of the cut portion is during a wet-tapping or "hot-tapping" procedure on piping within a semiconductor wafer fabrication facility. Wet-tapping allows a new pipe to be connected into an existing pipe while the existing pipe still contains fluid under pressure. During a wet-tapping procedure, a circular opening is cut into the side of the existing pressurized pipe. Because fluid may be flowing within the pipe, there is a risk that the section of pipe removed (i.e., portion cut by the hole-saw) will fall into the pipe, or be pulled into the pipe by the fluid flow, and be carried downstream where it can create blockage or system damage. Downtime and damage to semiconductor wafer fabrication equipment is very costly and should be avoided whenever possible. Hence, there is a need to safely perform wet-tapping into piping without risk of collateral damage to the manufacturing systems. A need therefore exist for maintaining control of the cut portion after cutting a circular opening.

SUMMARY OF THE INVENTION

Many of the problems outlined above are solved by the tool and method hereof. According to a first embodiment, a tool for cutting a circular opening and retaining the cut portion comprises a shaft having at least one cutting thread and at least one tapping thread, as well as a cutting member having at least one cutting bit radially displaced from the shaft. The shaft and the cutting member have a mutual rotational axis. The shaft may comprise at least one tapping thread extending along a portion of the shaft at a spaced distance from the cutting member. The spaced distance may be adjustable to accommodate different workpiece thicknesses. An adjustable radial position for the at least one cutting bit of the first embodiment tool allows for the same tool to cut a range of circular opening diameters.

The tool for cutting a circular opening and retaining the cut portion may comprise a shaft having at least one cutting thread and at least one male screw thread. The shaft has a distal end and a proximal end. A cutting member having at least one cutting bit is radially displaced from the shaft. The cutting bit may be located at the distal end of the cutting member. The shaft and the cutting member have a mutual rotational axis. The cutting member has a base where the cutting member connects with the shaft along the proximal end. The cutting thread and the male screw thread are located along the distal end of the mutual rotational axis beyond the base.

The cutting thread and the male screw thread may be located along the distal end of the mutual rotational axis at a spaced distance from the extent of the cutting member. The radial position for the cutting bit may be adjustable to allow for the same tool to cut a range of circular opening diameters.

The present tool may be utilized according to an improved method for cutting a circular opening and retaining the cut portion. The method comprises rotatably inserting at least one cutting thread and at least one tapping thread on a shaft entirely through a workpiece to form a pilot hole having at least one female screw thread. Thereafter, the shaft is maintained within the pilot hole while rotatably extending a cutting member of circular cross section greater than the pilot hole through the workpiece, thereby creating the circular opening and retaining the cut portion on the shaft.

The pilot hole inner diameter is secured against an outer surface of the shaft while being axially spaced from the at least one tapping thread. The various steps which comprise the present method can be performed in one continuous stroke while sustaining rotational motion, or with intermittent (possibly reverse) rotational motion.

BRIEF DESCRIPTION OF THE DRAWINGS

Other objects and advantages of the invention will become apparent upon reading the following detailed description and upon reference to the accompanying drawings in which.

Figure 1:
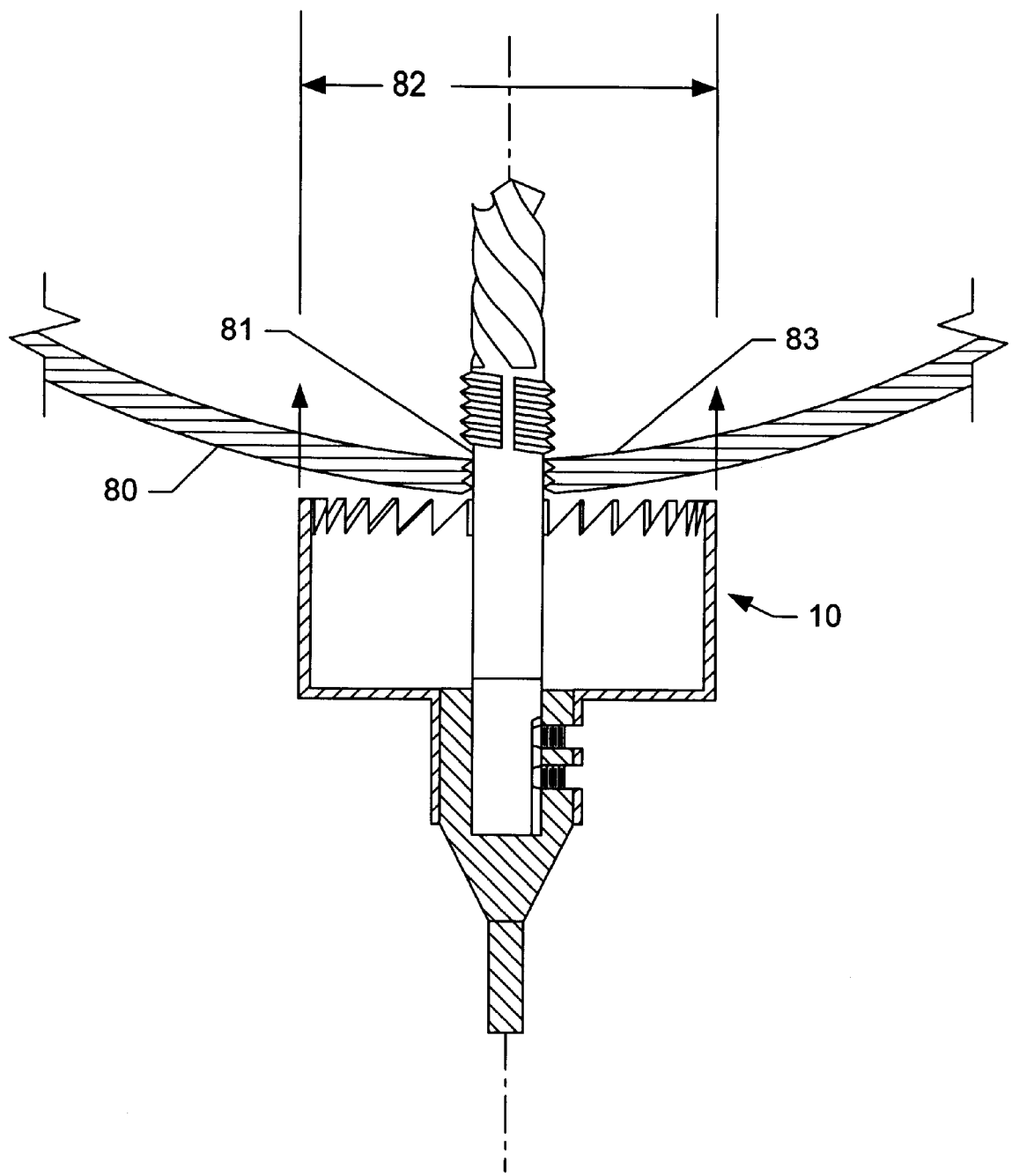
FIG. 1 shows a cross-section view of a pipe having a circular opening cut into it by one possible embodiment of the contemplated tool that cuts a circular opening and retains the cut portion.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 shows a cross-section view of a workpiece 80 (a pipe in this example) in which a pilot hole 81 having female screw threads has been created by one possible embodiment of the contemplated tool 10. One end of the tool 10 is threaded through the pilot hole 81 to allow the tool 10 to cut a circular opening 82 in the workpiece 80. The cut portion 83 resulting from cutting circular opening 82 may be retained by the tool 10.

Figure 2:
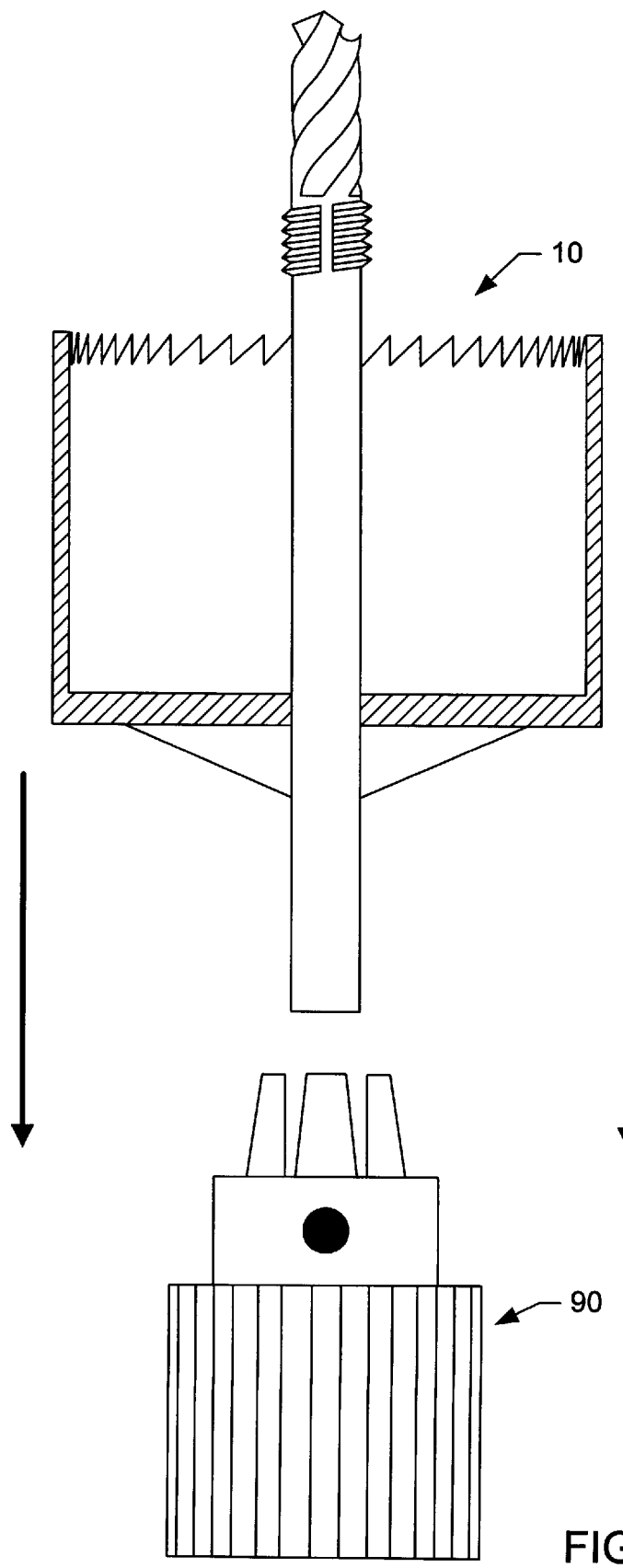
FIG. 2 shows another possible embodiment of the contemplated tool for cutting a circular opening and retaining the cut portion fitting into a chuck.

FIG. 2 shows another possible embodiment of tool 10 adapted to fit within a chuck 90, which might be a chuck associated with, e.g., an electric hand-held drill, a human-powered hand drill, a drill press, an end mill, a lathe, a computer-numerically-controlled (CNC) mill, a CNC lathe, a robotic arm, a force-impact hammer, a wet-tapping rig, a hot-tapping rig, or any machine providing rotational motion. Also, any other possible embodiment, including but not limited to the embodiments of FIGS. 3–12, may have a shaft 20 adapted to fit within a chuck 90.

Figure 3:
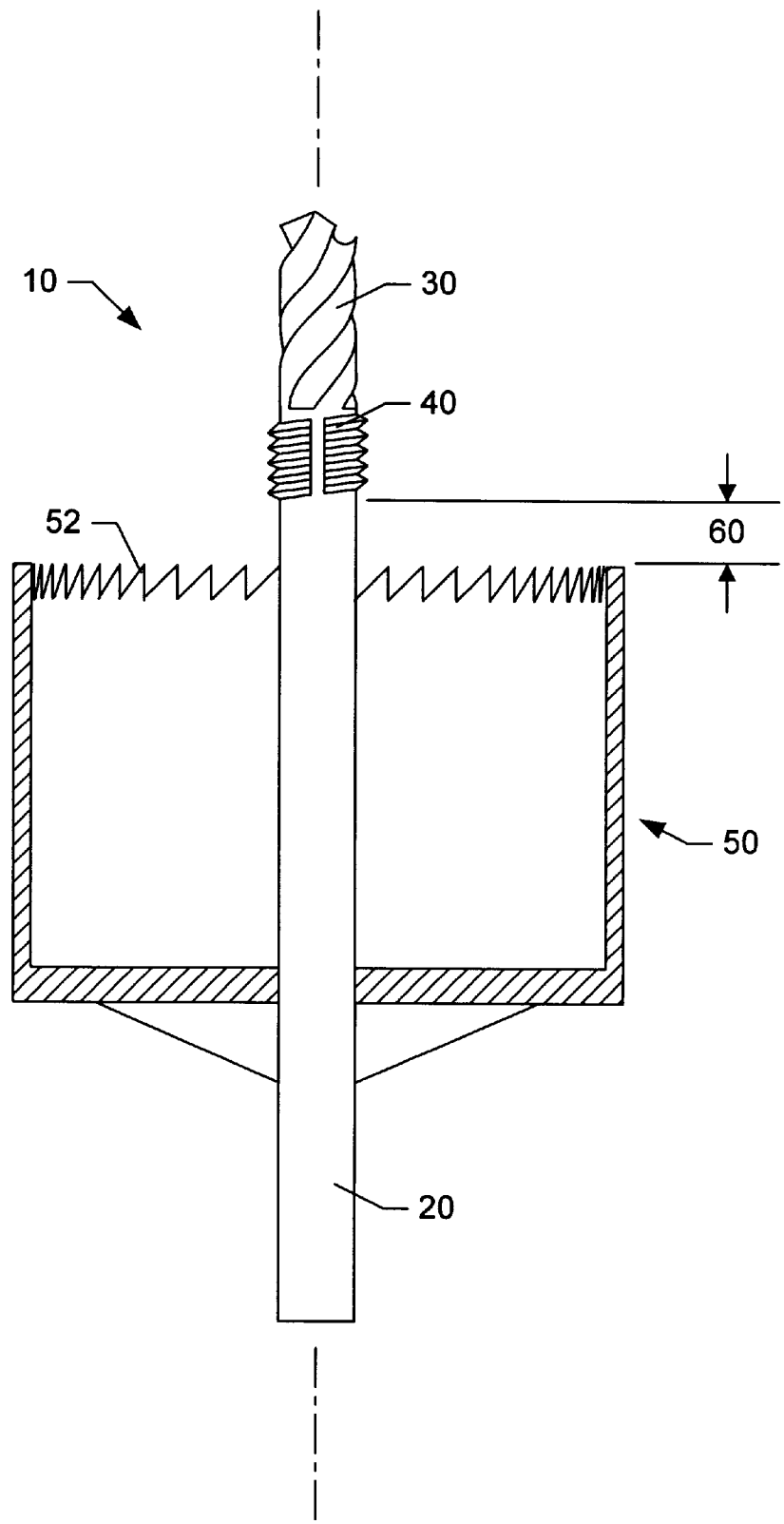
FIG. 3 is shows the contemplated tool for cutting a circular opening and retaining the cut portion in which cutting threads and tapping threads are separated from saw teeth by a spaced distance.

FIG. 3 illustrates tool 10 having cutting threads 30 and tapping threads 40 separated from saw teeth 52 by a spaced distance 60. Shaft 20 is shown with cutting threads 30 on one end and an attachment location for a chuck 90 on the other end. One of the primary purposes of the cutting threads 30 is to drill a hole in the workpiece 80 to create a pilot hole 81, as shown in FIG. 1. The cutting threads 30 might be conventional spiral cutting threads 30 as on a metal drill bit. There is a wide array of possible cutting thread patterns, material properties, and designs existing for the corresponding wide array of possible workpiece 80 materials. Hence, the tool 10 may be designed and fabricated with appropriate cutting thread specifications corresponding to the material of the workpiece 80. Likewise, any other possible embodiment using cutting threads 30, including but not limited to the embodiments of FIGS. 1–6 and 8, may have such variations in cutting thread design.

Adjacent to the cutting threads 30 are a set of tapping threads 40. One purpose of the tapping threads 40 is to cut female screw threads into the pilot hole 81. Thus, a proper design for smooth operation and to prevent cold welding, galling, tap teeth chipping, excessive tap wear, or tap breaking might include a cutting thread diameter closely corresponding to the smaller diameter of the tapping threads 40. The tapping threads 40 might be a conventional tapping thread pattern. There are many existing variations in tap patterns and material properties, including but not limited to variations of diameter, axial length, thread pitch, thread lead angle, straight flute, spiral flute, land, core diameter, chamfer relief, chamfer length, tapered, non-tapered, theoretical percentage of threading, rake angle, material, and hardness. Furthermore, tapping threads 40 may be designed to create a wide variety of thread forms, including but not limited to American standards, British standards, straight, metric, inch unified, cycle, rounded, sharp, v-shaped, acme, stub acme, pipe taper, and buttress. Thus, the tool 10 may be designed and fabricated with appropriate tapping thread specifications corresponding to the material and thickness of the workpiece 80, as well as the needs for a particular thread variation and form.

Another purpose of the tapping threads 40 is to prevent the cut portion 83 from axially sliding off the end of the shaft 20 after creating the circular opening 82. A single tapping thread 40 and a single female screw thread in the pilot hole 81 of workpiece 80 may be sufficient to fulfill this purpose. Thus, after the tapping threads 40 are through the pilot hole 81, the only way to remove the cut portion from the shaft 20, without using brute shearing force, is to unscrew or thread the tapping threads 40 back through the newly created female screw threads within the pilot hole 81. Set screws are provided to allow the pilot assembly to be removed from the hole saw. The plug may be removed by sliding it from the proximal end of the hole saw via loosening the set screws to detach the pilot assembly from the hole saw.

In FIG. 3 the tapping threads 40 are a spaced distance 60 from the saw teeth 52 of the cutting member 50. For smoother operation of the tool 10, the preferred spaced distance 60 is at least greater than the thickness of the workpiece to allow free rotation of the shaft 20 within the pilot hole without damaging the pilot hole female screw threads while maintaining alignment of the tool 10. The spaced distance 60 is not necessary to allow the cutting of a circular opening and retention of a cut portion. However, the tool 10 works much better for cutting circular openings in workpieces made from hard material when a spaced distance 60 at least greater than the workpiece thickness is provided. Likewise, any embodiment using tapping threads 40, including but not limited to the embodiments of FIGS. 1–5 and 7–12, may have such variations in the tapping thread design.

The saw teeth 52 on the cutting member 50 may be conventional saw teeth. The saw teeth patterns, materials, shapes, and designs may, however, be altered dependent upon the workpiece material being cut. Therefore, the tool 10 can be designed and fabricated with appropriate saw tooth specifications corresponding to the material and thickness of the workpiece. Likewise, any embodiment using saw teeth 52, including but not limited to the embodiments of FIGS. 1–3, 6–9, and 11 may have such variations in the saw tooth design.

The tool 10 in FIGS. 2 and 3 is formed from one integral piece, but such embodiment could also be made from many separate pieces adapted to fit together. For example, the cutting member 50 could be interchangeable to allow replacement due to worn saw teeth 52 or substituting alternative cutting members with different cutting diameters or different saw tooth specifications for a wide variety of applications. Likewise, any embodiment, including but not limited to the embodiments of FIGS. 1–12, may be made from one integral piece or from many separate pieces adapted to fit together.

Also, the shaft 20 length could be varied for adjustable shaft 20 lengths. A longer shaft 20 may be easier to use because it can slide into the pilot hole and completely through the workpiece while providing the tool 10 operator time during insertion to stabilize and ensure that the cutting member's rotational axis is normal to the workpiece. Sometimes physical restrictions on the inside of the workpiece prevent the use of a longer shaft 20 that extends deep within the workpiece while cutting a circular opening, making a relatively short shaft 20 of a particular length more applicable. The tool 10 can also have interchangeable shafts to allow the insertion of a variety of shaft 20 lengths and types (e.g., cutting thread tip, point tip, auger tip) to correspond to an array of workpiece physical restrictions and materials. Likewise, any embodiment, including but not limited to the embodiments of FIGS. 1–12, may have an adjustable or a permanently fixed shaft 20.

Figure 4:
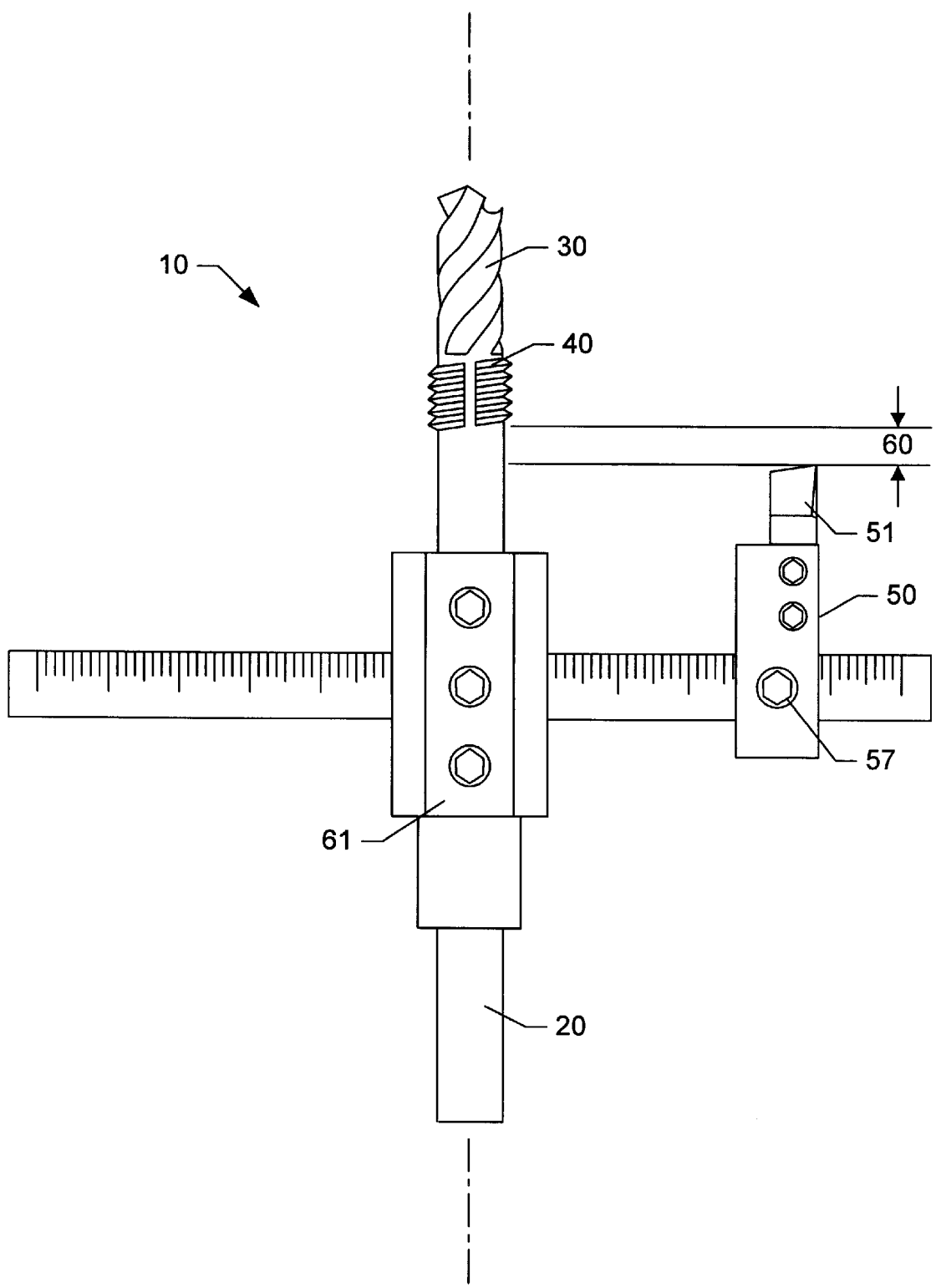
FIG. 4 is another possible embodiment of the contemplated tool for cutting a circular opening and retaining the cut portion having cutting threads and tapping threads separated from a cutting bit by a spaced distance.

FIG. 4 illustrates another possible embodiment of tool 10 having cutting threads 30 and tapping threads 40 separated from a cutting bit 51 by an adjustable spaced distance 60. The cutting member 50 of FIG. 4 has a single cutting bit 51 that rotates about the mutual rotational axis with the shaft 20 at a radius corresponding to the desired circular opening 82 diameter. However, there could be multiple cutting bits angularly spaced from each other about the shaft 20. Also, the cutting bit 51 could have multiple cutting blades. The cutting member 50 in FIG. 4 has an adjustable radial position 57 for the cutting bit 51, which can be moved and locked in place allowing the same blade to cut a wide range of circular opening diameters. The cutting bit 51 is interchangeable to allow replacement of worn bits or substitution of alternative cutting bits for varying workpiece materials and configurations. Likewise, any embodiment using at least one cutting bit 51, including the embodiments of FIGS. 4, 6–9, and 12 may have cutting bit variations, adjustable radial positions for cutting bits, and interchangeable cutting bits.

The adjustable spaced distance 60 may be varied by moving the shaft 20 in relation to the cutting member 50. The shaft 20 may be moved axially through a housing 61 and locked in place within the housing 61. The housing 61 permits movement of the shaft 20, and therefore allows the tool 10 to be adjusted for a wide array of workpiece thicknesses. Adjusting spaced distance 60 such that it is greater than the workpiece thickness can provide smoother operation of the tool 10, help preserve the pilot hole female screw threads, and reduce the wear on tool 10. Likewise, any embodiment, including the embodiments of FIGS. 1–12, may have an adjustable, interchangeable, or permanently fixed shaft. Also likewise, any embodiment, including the embodiments of FIGS. 1–8 and 10–12, may have an adjustable or permanently fixed spaced distance 60.

Figure 5:
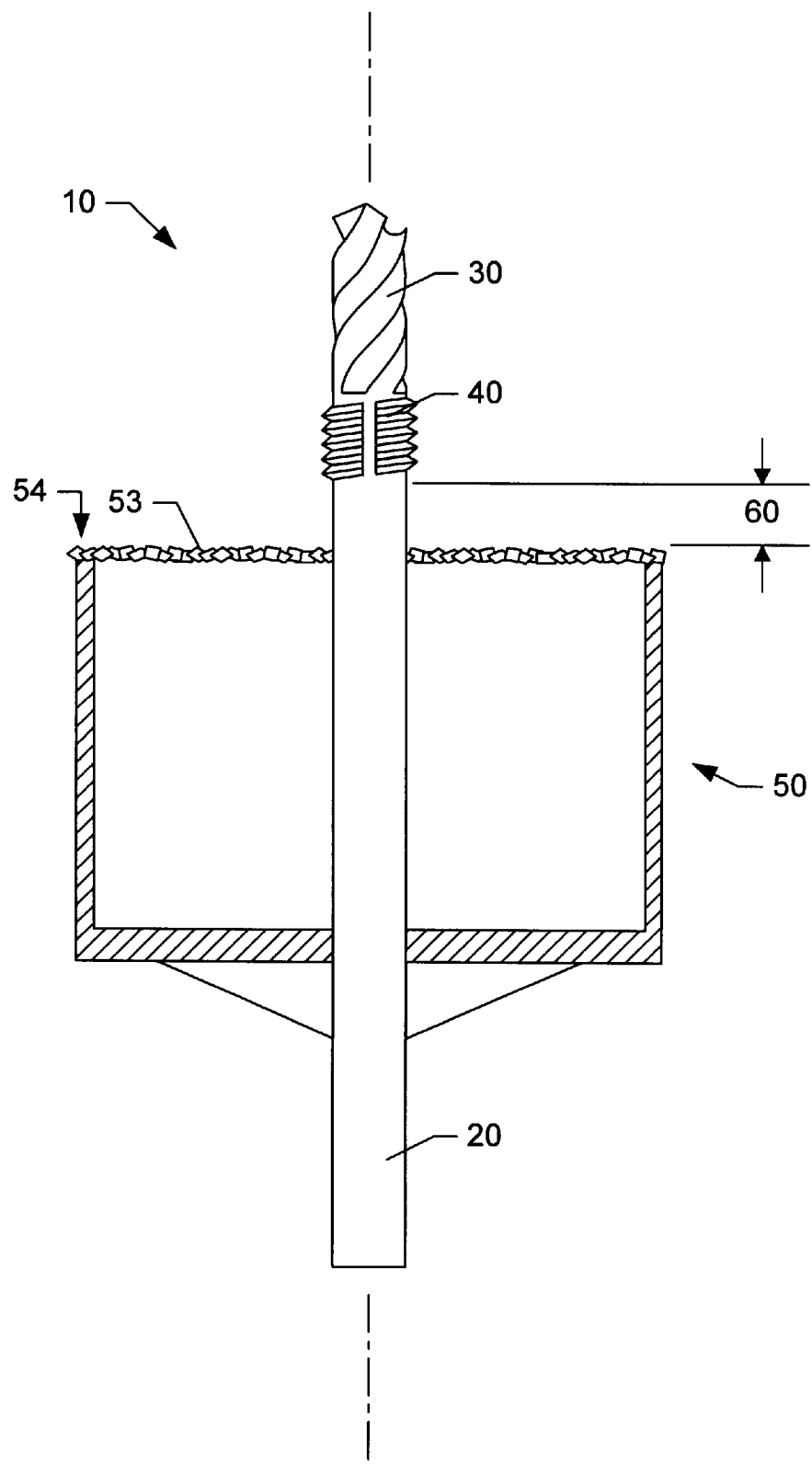
FIG. 5 is another possible embodiment of the contemplated tool for cutting a circular opening and retaining the cut portion having cutting threads and tapping threads separated from grit particles by a spaced distance.

FIG. 5 illustrates another possible embodiment of tool 10 having cutting threads 30 and tapping threads 40 separated from grit particles 53 by a spaced distance 60. The FIG. 5 embodiment is the same as the FIGS. 2 and 3 embodiment except that it has grit particles 53 instead of saw teeth 52 as its cutting bits on the edge 54 of the cutting member 50. The grit particles 53 are arbitrarily fixed to the edge 54 of the cutting member 50 by an adhesive, but other forms of fixation could be used. The grit particles 53 are sharp, angular chunks of hard material, such as carbide, diamond, or minerals. Each grit particle acts as a small cutting bit 51 much like a grinding wheel or sand paper. The grit particles 53 can vary in size creating a variety of coarseness ratings for different applications and materials. Thus, the tool 10 may be designed and fabricated with appropriate grit particle specifications corresponding to the workpiece material and smoothness desired for the circular opening cut. Likewise, any embodiment using grit particles 53, including the embodiments of FIGS. 5 and 6–11 could have such variations in grit particle application and design.

Figure 6:
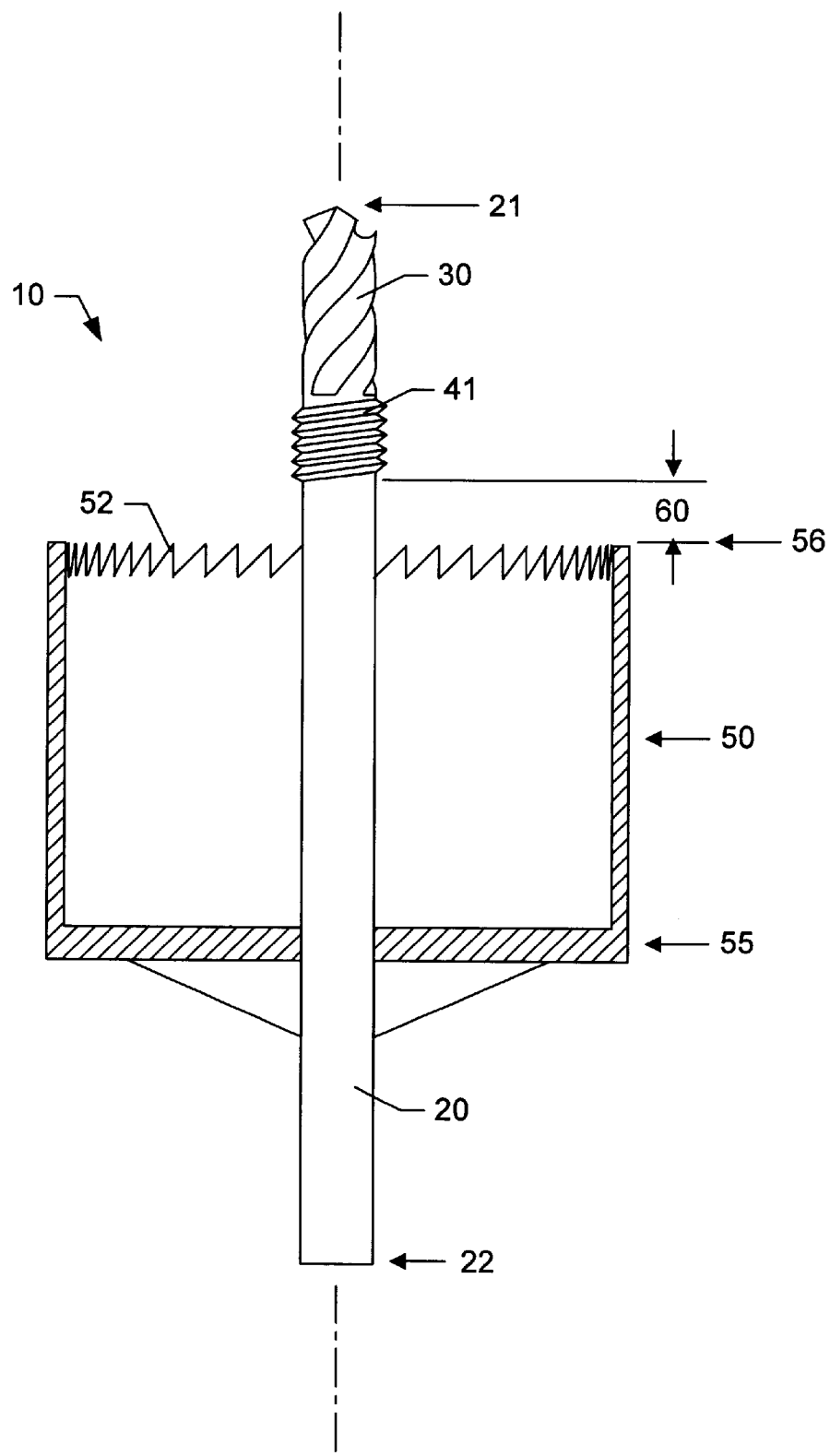
FIG. 6 is another possible embodiment of the contemplated -tool for cutting a circular opening and retaining the cut portion having cutting threads and male screw threads separated from saw teeth by a spaced distance.

FIG. 6 illustrates another possible embodiment of tool 10 having cutting threads 30 and male screw threads 41 separated from saw teeth 52 by a spaced distance 60. The FIG. 6 embodiment is the same as the FIGS. 2 and 3 embodiment except that it has male screw threads 41 instead of tapping threads 40. Alternatively, saw teeth 52 may be replaced by grit particles or some other form of cutting bit. The purpose of the male screw threads 41 is to prevent the cut portion from axially sliding off the end of the shaft 20 after creating the circular opening. The male screw threads 41 are distinguished from male screw threads that could be used at the base 55 of the cutting member 50 to hold interchangeable cutting members in place. A single male screw thread 41 and a single female screw thread in the pilot hole may be sufficient to fulfill this purpose. The male screw threads 41 may be used where a pilot hole already has corresponding female screw threads. However, if the workpiece material is malleable, a pilot hole may be created with the cutting threads 30. While maintaining rotational motion of the tool 10, the male screw threads 41 may be pressed through the pilot hole, forging new female screw threads (instead of cutting new female screw threads as with tapping threads) into the pilot hole.

A proper design for smooth operation and to prevent cold welding, excessive male screw wearing, or tool 10 breaking may include a cutting thread diameter closely corresponding to the smaller diameter of the male screw threads 41. After the male screw threads 41 pass through the pilot hole forming female screw threads within the pilot hole, the male screw threads 41 reside on one side of the workpiece while the extent 56 of the cutting member 50 resides on the opposite side of the workpiece, which means only the shaft 20 portion at the spaced distance 60 resides within the pilot hole. The shaft 20 portion at the spaced distance 60 should have a smaller diameter than the inside diameter of the pilot hole female screw threads so that the shaft 20 can freely rotate within the pilot hole.

The male screw threads 41 may be a conventional screw thread pattern. There are many existing variations in screw patterns and material properties, including but not limited to variations of diameter, axial length, coarse thread, fine thread, thread pitch, thread lead angle, chamfer relief, chamfer length, tapered, non-tapered, material, and hardness. The male screw threads 41, much like tapping threads 40 discussed above, may have a variety of forms, including but not limited to American standards, British standards, straight, metric, inch unified, cycle, rounded, sharp, v-shaped, acme, stub acme, pipe taper, and buttress. Thus, the tool 10 may be designed and fabricated with an appropriate male screw thread specifications corresponding to the material of the workpiece, as well as the needs for a particular thread variation and form. Likewise, any embodiment using the male screw threads 41, including the embodiments of FIGS. 6–12, may have such variations in male screw thread design.

Figure 7:
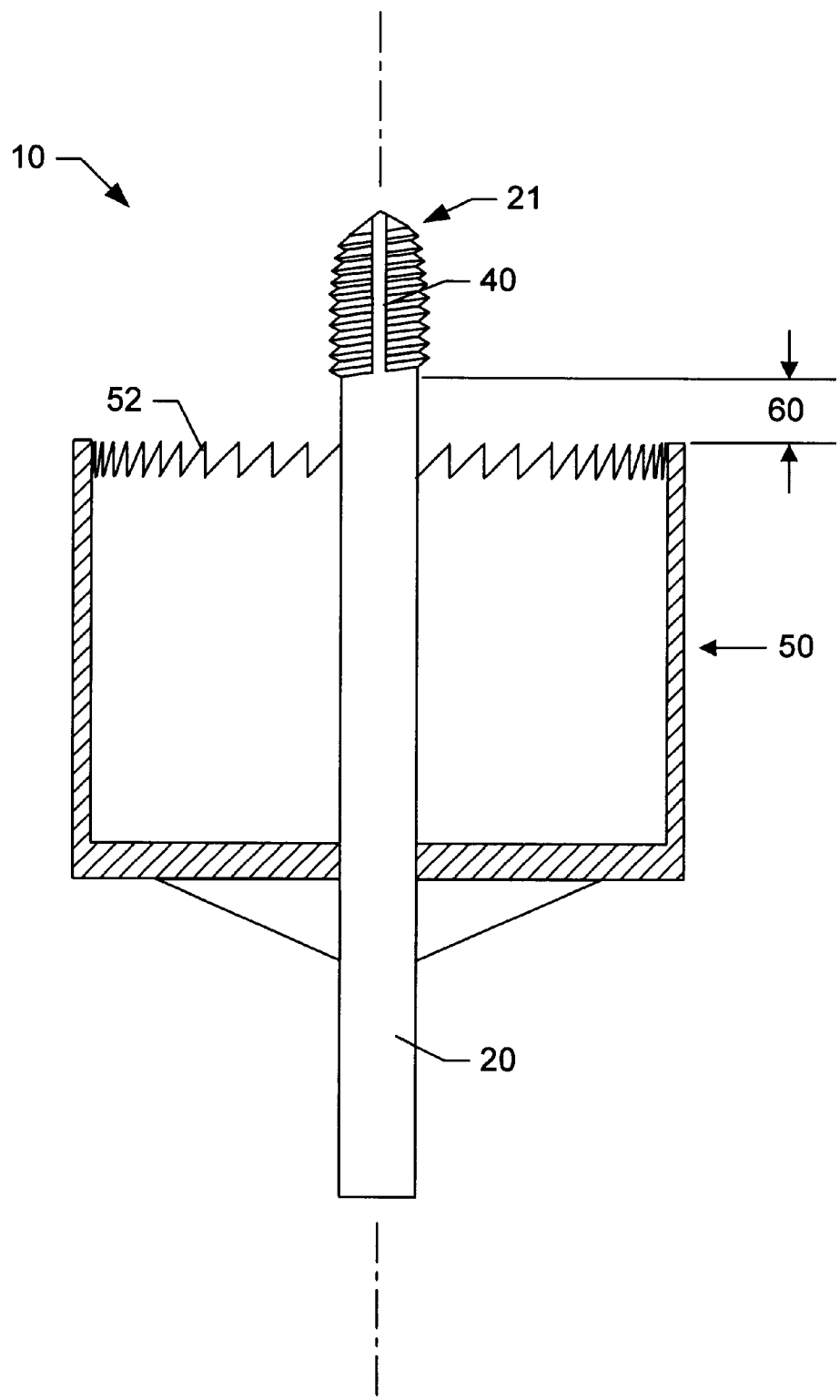
FIG. 7 is another possible embodiment of the contemplated tool for cutting a circular opening and retaining the cut portion having tapping threads separated from saw teeth by a spaced distance.

FIG. 7 illustrates another possible embodiment of tool 10 having only tapping threads 40 (no cutting threads) separated from saw teeth 52 by a spaced distance 60. Because the FIG. 7 embodiment has only tapping threads 40, a pilot hole should be created in the workpiece using a separate tool (e.g., a drill bit) before using the tool 10 in FIG. 7. Alternatively, saw teeth 52 may be replaced by grit particles or some other form of cutting bit. Also, in an alternate embodiment, male screw threads may be substituted for tapping threads 40.

One purpose of the tapping threads 40 is to cut female screw threads into the pilot hole, as discussed above regarding the embodiment of tapping threads 40 in FIGS. 2 and 3. Thus, a proper design for smooth operation and to prevent cold welding, galling, tap teeth chipping, excessive tap wear, or tap breaking may have a pilot hole diameter closely corresponding to the smaller diameter of the tapping threads 40. The tapping threads 40 may be a conventional tapping thread pattern. There are many existing variations in tap patterns and material properties, including but not limited to variations of diameter, axial length, thread pitch, thread lead angle, straight flute, spiral flute, land, core diameter, chamfer relief, chamfer length, tapered, non-tapered, theoretical percentage of threading, rake angle, material, and hardness. Furthermore, tapping threads 40 may be designed to create a wide variety of thread forms, including but not limited to American standards, British standards, straight, metric, inch unified, cycle, rounded, sharp, v-shaped, acme, stub acme, pipe taper, and buttress.

The FIG. 7 embodiment has tapered or chamfered tapping threads 40. The tip of the tapping threads 40 (or male screw threads) may also be flat, extended, pointed, or rounded, among other tip shapes. The chamfered, tapered, pointed, extended, and rounded tips may be easier to use than a flat tip because such tips act as a pilot shaft initially while starting the threads. Thus, the tool 10 may be designed and fabricated with appropriate tapping thread specifications corresponding to the material and thickness of the workpiece, as well as the needs for a particular thread variation and form. Likewise, any embodiment using a only tapping threads 40 at the distal end 21 of the shaft 20 may have such variations in tapping thread designs. Another purpose of the tapping threads 40 is to prevent the cut portion of the workpiece from axially sliding off the end of the shaft 20 after creating the circular opening. Thus, after the tapping threads 40 have passed through the pilot hole, the cut portion can be removed from the shaft 20. Removal occurs without using brute shearing force by unscrewing or threading the tapping threads 40 back through the newly created female screw threads within the pilot hole.

Figure 8:
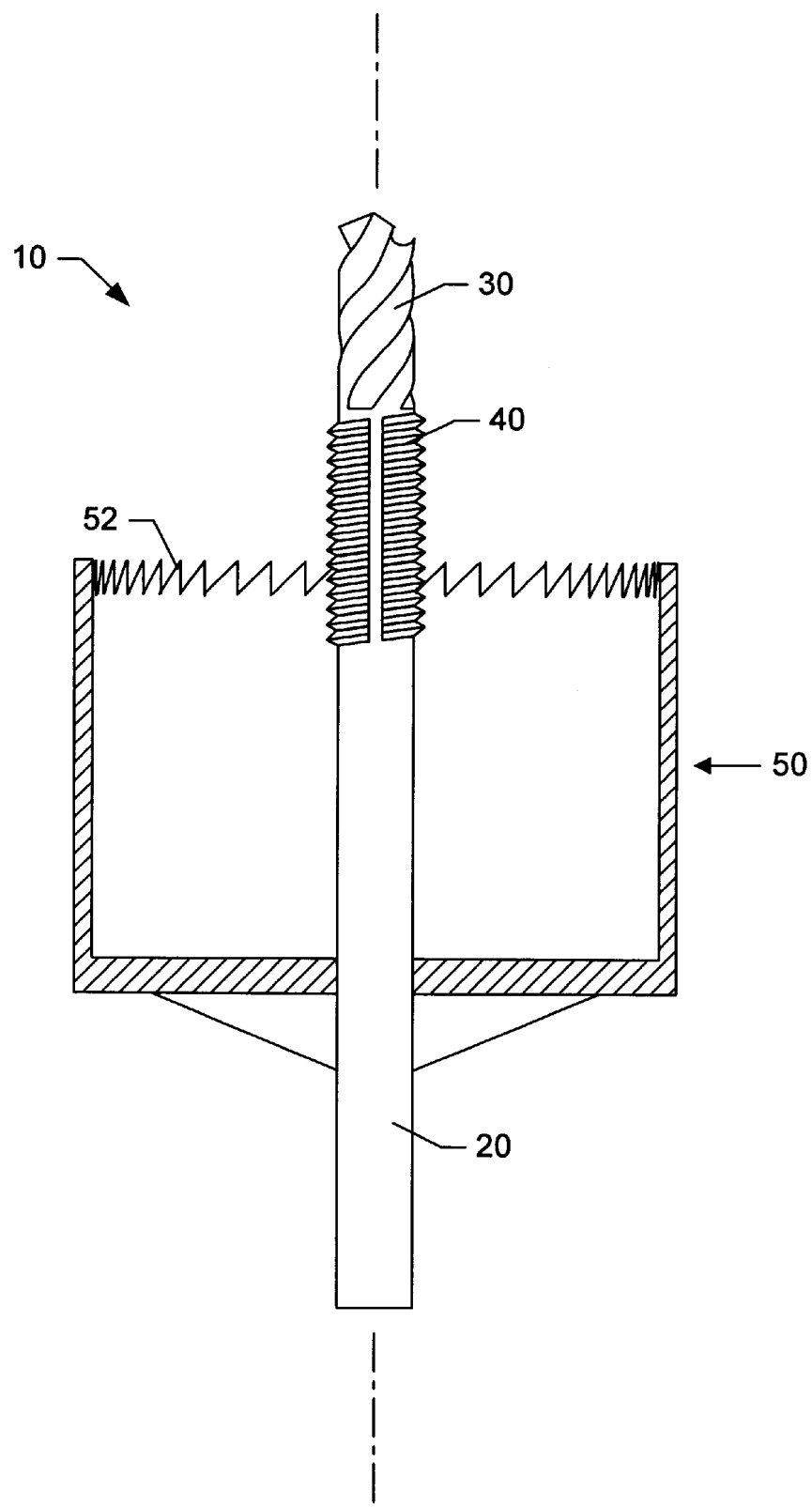
FIG. 8 is another possible embodiment of the contemplated tool for cutting a circular opening and retaining the cut portion having cutting threads, tapping threads, and saw teeth.

FIG. 8 is another possible embodiment of the contemplated tool 10 having cutting threads 30, tapping threads 40, and saw teeth 52, but with no spaced distance 60 separating the cutting threads 30 and tapping threads 40 from the saw teeth 52. The FIG. 8 embodiment is the same as the FIGS. 2 and 3 embodiment except that it has no spaced distance 60. Even without the spaced distance 60, the tool 10 is still able to create female screw threads in the pilot hole so that the cut portion may be retained after cutting the circular opening in the workpiece. The FIG. 8 embodiment may best be applied to workpiece materials that allow the saw teeth 52 of the cutting member 50 to extend entirely through the workpiece 80, creating the circular opening at an axial movement rate corresponding to the pitch of the tapping threads 40. Otherwise, the tapping threads 40 could ream out the pilot hole, thereby eliminating a substantial portion of the pilot hole female screw threads. If the pilot hole loses all of its female screw threads, then the tapping threads 40 may be incapable of sufficiently preventing the cut portion from axially sliding off the end of the shaft 20. Alternatively, tapping threads 40 may be replaced with grit particles or some other form of a cutting bit. Also, in an alternate embodiment, male screw threads may be substituted for tapping threads 40.

Figure 9:
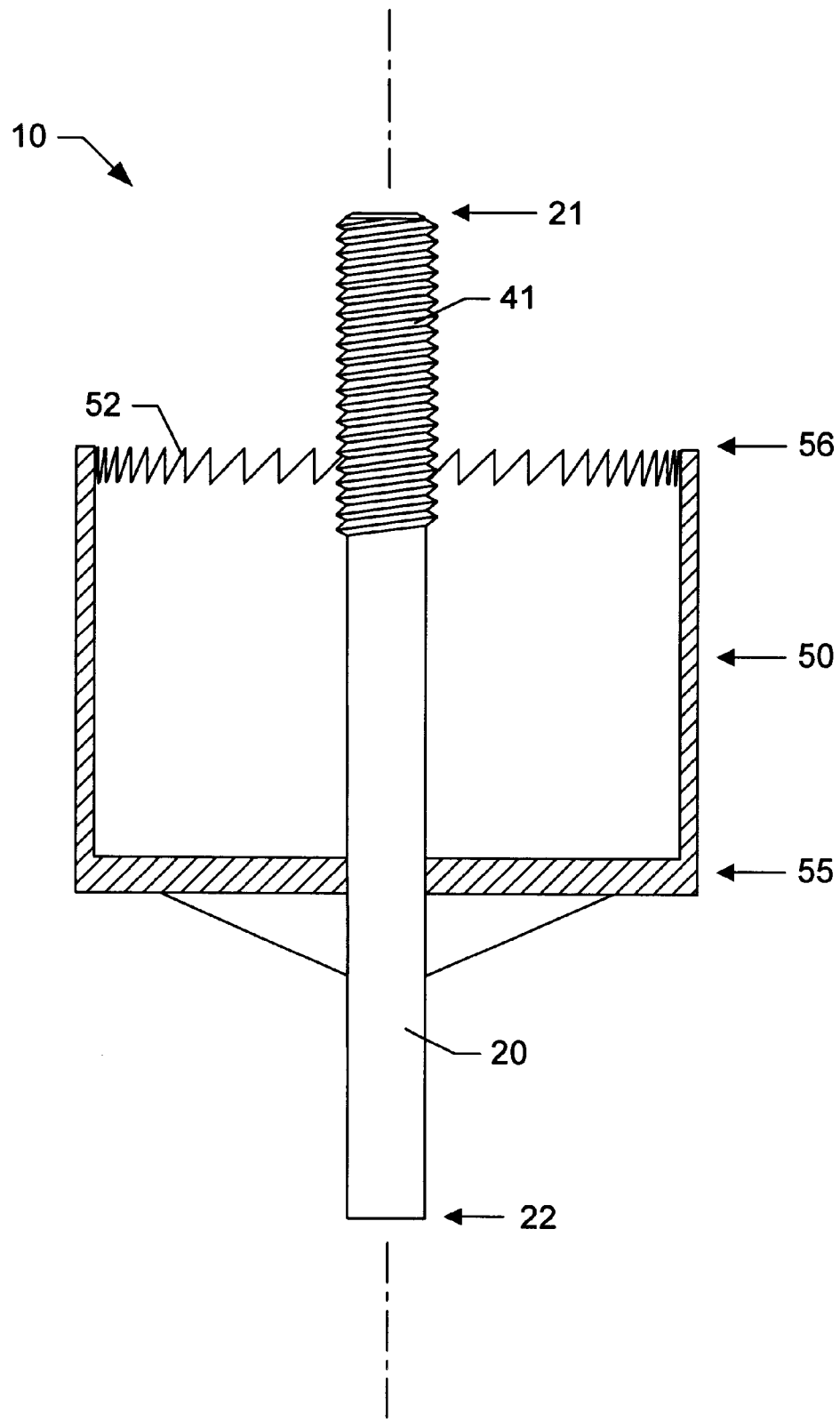
FIG. 9 is another possible embodiment of the contemplated tool for cutting a circular opening and retaining the cut portion having male screw threads and saw teeth.

FIG. 9 is another possible embodiment of the contemplated tool 10 having male screw threads 41 and saw teeth 52, but with no spaced distance 60 separating the male screw threads 41 from the saw teeth 52 and no cutting threads 30. Also, the male screw threads 41 extend axially along the distal end 21 beyond the base 55 of the cutting member 50, which further distinguishes the male screw threads 41 from male screw threads that could reside at the base 55 of the cutting member 50 with the function of holding interchangeable cutting members in place. Alternatively, male screw threads 41 may be replaced by tapping threads. Also, in an alternate embodiment, grit particles, or some other form of a cutting bit, may be substituted for saw teeth 52.

Even without the spaced distance 60, the FIG. 9 embodiment may still forge female screw threads in the pilot hole to perform the function of retaining the cut portion after cutting the circular opening. The FIG. 9 embodiment works best on workpiece materials that allow the saw teeth 52 of the cutting member 50 to extend entirely through the workpiece, creating the circular opening at an axial movement rate corresponding to the pitch of the male screw threads 41. Otherwise, the male screw threads 41 could ream out the pilot hole, thereby eliminating most all of the pilot hole female screw threads. If the pilot hole loses all of its female screw threads, then the male screw threads 41 may be incapable of sufficiently preventing the cut portion from axially sliding off the end of the shaft 20.

Figure 10:
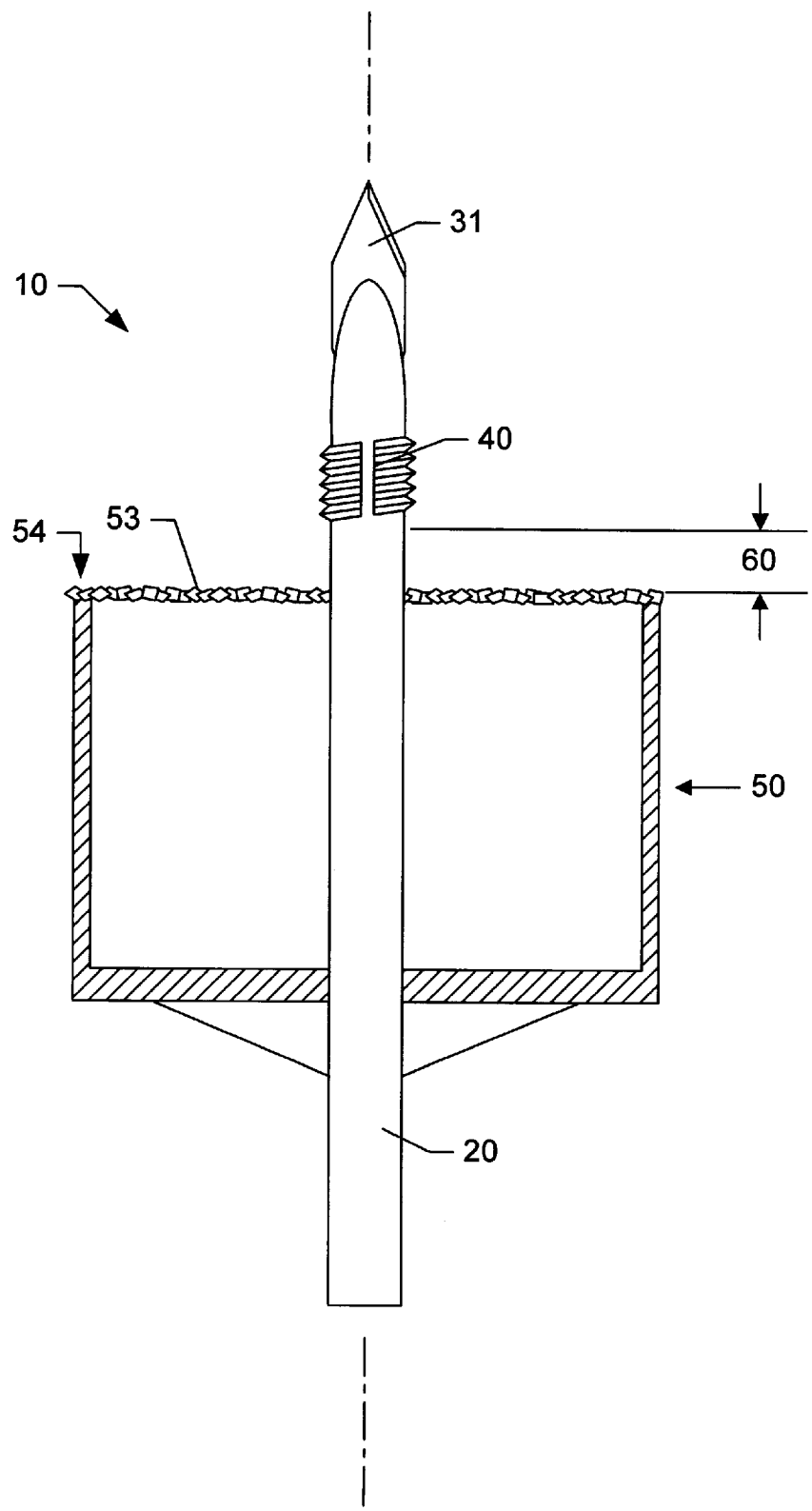
FIG. 10 is another possible embodiment of the contemplated tool for cutting a circular opening and retaining the cut portion having a cutting tip and tapping threads separated from grit particles by a spaced distance.
Figure 11:
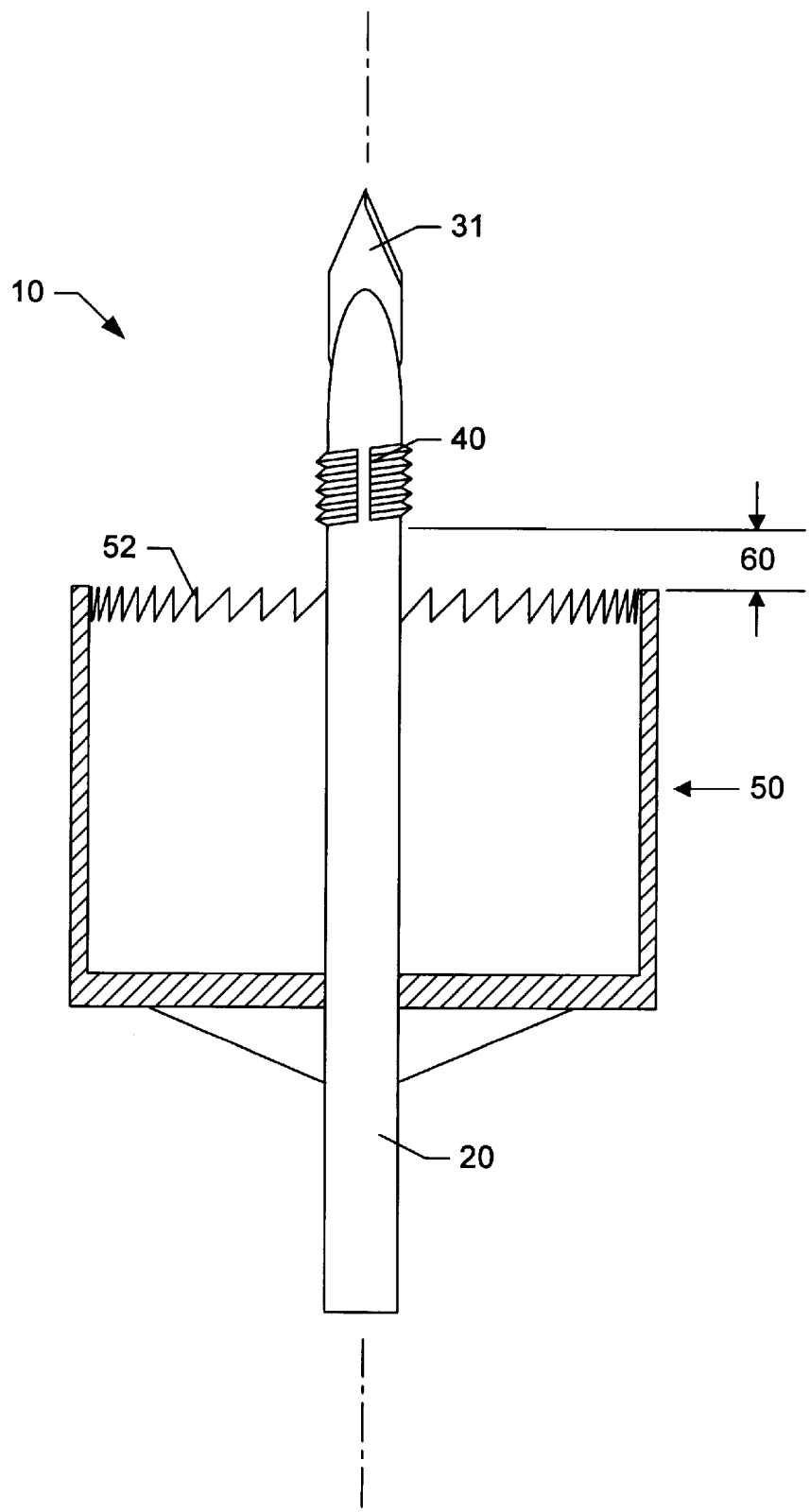
FIG. 11 is another possible embodiment of the contemplated tool for cutting a circular opening and retaining the cut portion having a cutting tip and tapping threads separated from saw teeth by a spaced distance.
Figure 12:
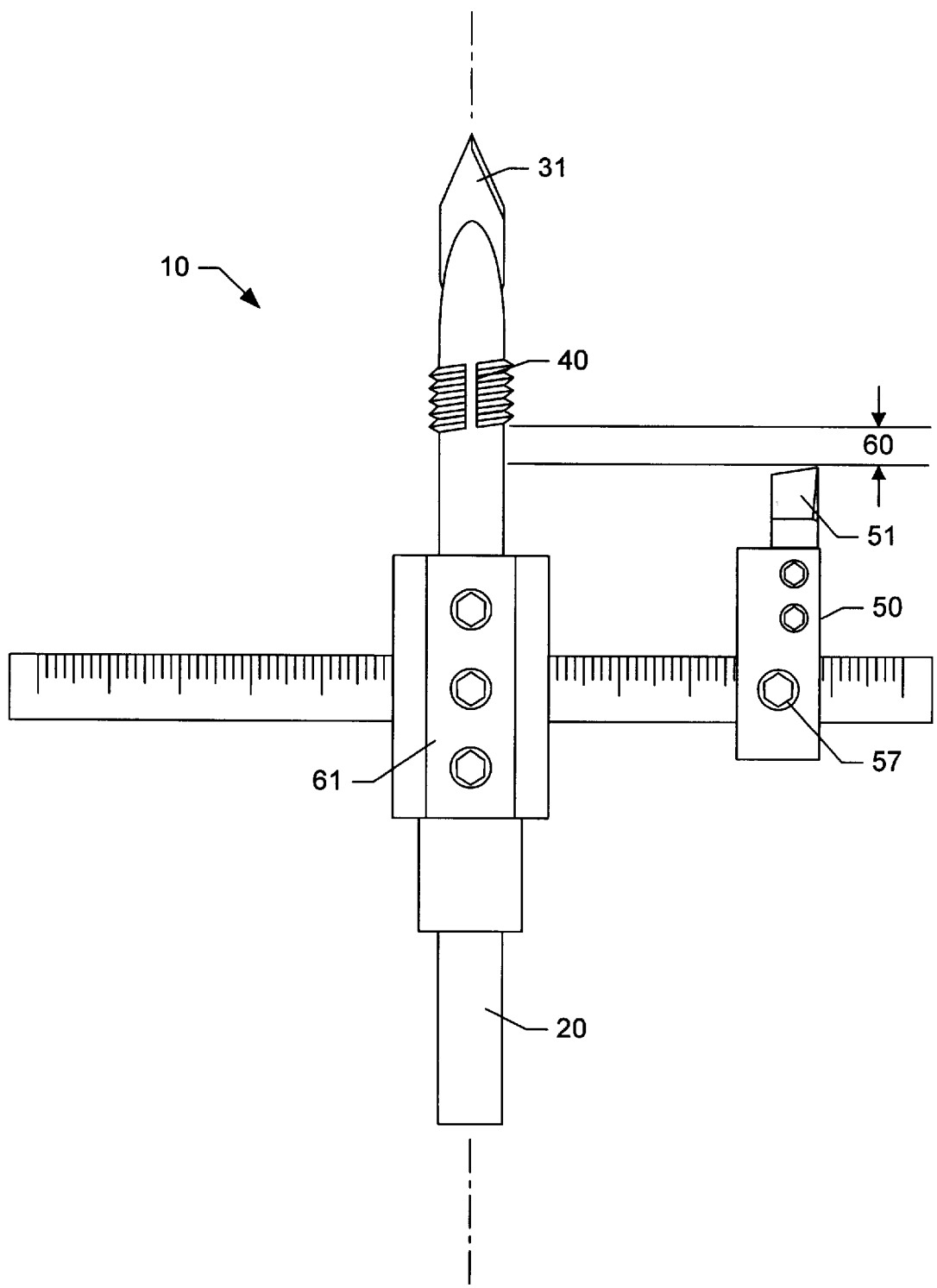
FIG. 12 is another possible embodiment of the contemplated tool for cutting a circular opening and retaining the cut portion having a cutting tip and tapping threads separated from a cutting bit by a spaced distance.

FIG. 10 is another possible embodiment of the contemplated tool 10 having a cutting tip 31 and tapping threads 40 separated from grit particles 53 by a spaced distance 60. As shown in FIGS. 11 and 12, grit particles 53 may be replaced by saw teeth 52 or cutting bit 51. The FIG. 10 embodiment is the same as the FIG. 5 embodiment except that it utilizes a cutting tip 31 instead of cutting threads 30, which is an alternative means for creating a pilot hole in a workpiece. The cutting tip 31 of the FIG. 10 embodiment uses a pointed and planar cutting tip 31 having sharp edges similar to a conventional wood auger. Many variations may be made to the cutting tip 31, including but not limited to variations such as more than one planar blade with a common point, angle of point, angle of blade edge, thickness of blade, width of blade, one integral piece, several complimentary pieces forming the cutting tip 31, material, and hardness. Thus, the tool 10 may be designed and fabricated with appropriate cutting tip 31 specifications corresponding to the material of the workpiece. Likewise, any embodiment using a cutting tip 31, including but not limited to the embodiments of FIGS. 10–12, could have such variations in cutting tip design.

There are various methods for using the embodiments of the tool 10 outlined above to cut a circular opening 82 in a workpiece 80 and retaining the cut portion 83. One possible method using either of the embodiments of FIGS. 1–6, 8, and 10–12 first involves drilling a pilot hole 81 in the workpiece 80 using the cutting threads 30 or cutting tip 31. Then, while maintaining rotational motion of shaft 20 and continuously inserting the tool 10 into the workpiece 80, female screw threads 81 are created in the pilot hole 81 using the tapping threads 40 or male screw threads 41. The shaft 20 is maintained in the pilot hole 81 to ensure that the centralized point of the rotational axis of tool 10 remains concentric to the centralized point of the desired circular opening 82. The rotational motion of shaft 20 and the insertion of the tool 10 into the workpiece 80 is continued until the circular opening 82 is cut as the cutting member (saw teeth 52, grit particles 53, or cutting bit 51) is extended entirely through the workpiece 80.

For the tool 10 depicted in either of the embodiments of FIGS. 1–6 and 10–12, the cut portion 83 is retained on the shaft 20 toward the proximal end 22 beyond the male screw threads 41 or tapping threads 40 to prevent the axial sliding of the cut portion 83 off the distal end of the shaft 20. For the tool 10 depicted in FIG. 8, the cut portion 83 on the shaft 20 is either threaded on the tapping threads 40 (or male screw threads) or retained towards the proximal end 22 beyond the tapping threads 40 (or male screw threads) to prevent the axial sliding of the cut portion 83 off the distal end 21 of the shaft 20. Such sliding is prevented by the axial interference between the pilot hole female screw threads 81 and the tapping threads 40 or male screw threads 41. Hence, the only way to remove the cut portion 83 from the shaft 20, without using brute shearing force, is to unscrew or thread the tapping threads 40 or male screw threads 41 back through the pilot hole female screw threads 81.

In an alternate embodiment, the rotational motion of shaft 20 may be terminated between or during at least one of the steps described above. Stopping the rotational motion of shaft 20 may be necessary to change the direction of rotation, and thereby accommodate for mismatches in cutting directions (clockwise cutting or counter-clockwise cutting) between the cutting threads 30, cutting tip 31, tapping threads 40, or cutting bit 51. Also, such stopping may be required for alignment purposes without the need for a reverse in rotational direction.

In another embodiment, the torque or speed of the rotational motion may be varied between or during at least one of the steps described above. Such variations in rotational motion may be needed to compensate for variations in the workpiece 80 material. Also, such variations in rotational motion may be needed when moving from one step of the method to the next to accommodate for the different sections of the tool 10 being used. As a general rule for proper tool 10 use, smaller diameter tools require faster rotation than larger diameter tools during cutting.

Another possible method for cutting a circular opening in a workpiece may be performed using the embodiments of tool 10 depicted in FIGS. 7 and 9. The distal end 21 of the shaft 20 having tapping threads 40 or male screw threads 41 is first inserted into an already drilled pilot hole while it is being rotated. While maintaining its rotational motion, the tool 10 is continuously inserted into the workpiece, thereby cutting female screw threads into the pilot hole using the tapping threads 40 or male screw threads 41. As tool 10 is being rotated and inserted into the workpiece, the shaft 20 is maintained within the pilot hole to ensure that the centralized point of the rotational axis of tool 10 remains concentric to the centralized point of the desired circular opening. Then, while still maintaining rotational motion of tool 10, the circular opening is cut by extending the saw teeth 52 (or grit particles or cutting bit) entirely through the workpiece.

For the tool 10 depicted in FIG. 7, the cut portion of the workpiece is retained on the shaft 20 toward the proximal end 22 beyond the tapping threads 40 (or male screw threads) to prevent the axial sliding of the cut portion off the distal end 21 of the shaft 20. For the tool 10 depicted in FIG. 9, the cut portion is retained either on the male screw threads 41 (or tapping threads) or on the shaft 20 toward the proximal end 22 beyond the male screw threads 41 (or tapping threads) to prevent the axial sliding of the cut portion 83 off the distal end 21 of the shaft 20. Such sliding is prevented by the axial interference between the pilot hole female screw threads and the tapping threads 40 (or male screw threads).

In an alternate embodiment using the tool 10 depicted in FIG. 7, the rotational motion of shaft 20 may be terminated between or during at least one of the steps described above. Stopping the rotational motion of shaft 20 may be necessary to change the direction of rotation, and thereby accommodate for mismatches in cutting directions (clockwise cutting or counter-clockwise cutting) between the tapping threads 40 (or male screw threads) and saw teeth 52 (or grit particles or cutting bit). Also, such stopping may be required for alignment purposes without the need for a reverse in rotational direction.

In another embodiment, the torque or speed of the rotational motion may be varied between or during at least one of the steps described above. Such variations in rotational motion may be needed to compensate for variations in the workpiece material. Also, such variations in rotational motion may be needed when moving from one step of the method to the next to accommodate for the different sections of the tool 10 being used. As a general rule for proper tool 10 use, smaller diameter tools require faster rotation than larger diameter tools during cutting.

What is claimed is:

1. A tool for cutting a circular opening and retaining the cut portion, comprising:
   a shaft having a distal end and a proximal end, wherein the shaft has at least one cutting thread and at least one tapping thread, and wherein the at least one cutting thread and the at least one tapping thread are along the distal end; and
   a cutting member having a distal portion and a proximal portion, wherein the cutting member has at least one cutting bit along the distal portion, wherein the cutting bit is radially displaced from the shaft, wherein the shaft and the cutting member have a mutual rotational axis, and wherein the at least one tapping thread extends an adjustable spaced distance along the shaft beyond the extent of the distal portion of the cutting member.

2. A tool for cutting a circular opening and retaining the cut portion, comprising:
   a shaft having at least one cutting thread and at least one male screw thread, wherein the shaft has a distal end and a proximal end; and
   a cutting member having at least one saw tooth radially displaced from the shaft, wherein the shaft and the cutting member have a mutual rotational axis, wherein the cutting member has a base where the cutting member connects with the shaft along the proximal end, wherein the at least one saw tooth is located at the distal end of the cutting member, wherein the at least one cutting thread and the at least one male screw thread are located along the distal end of the mutual rotational axis beyond the base, and wherein the at least one cutting thread and the at least one male screw thread are located along the distal end of the mutual rotational axis at an adjustable spaced distance from the extent of the cutting member.

3. A tool for cutting a circular opening and retaining the cut portion, comprising:
   a shaft having at least one cutting thread and at least one male screw thread, wherein the shaft has a distal end and a proximal end; and
   a cutting member having at least one grit particle radially displaced from the shaft, wherein the shaft and the cutting member have a mutual rotational axis, wherein the cutting member has a base where the cutting member connects with the shaft along the proximal end, wherein the at least one grit particle is fixed to an edge of the cutting member and located at the distal end of the cutting member, wherein the at least one cutting thread and the at least one male screw thread are located along the distal end of the mutual rotational axis beyond the base, and wherein the at least one cutting thread and the at least one male screw thread are located along the distal end of the mutual rotational axis at an adjustable spaced distance from the extent of the cutting member.

4. A tool for cutting a circular opening and retaining the cut portion, comprising:
   a shaft having at least one male screw thread, wherein the shaft has a distal end and a proximal end; and
   a cutting member having at least one saw tooth radially displaced from the shaft, wherein the shaft and the cutting member have a mutual rotational axis, wherein the cutting member has a base where the cutting member connects with the shaft along the proximal end, wherein the at least one saw tooth is located at the distal end of the cutting member, wherein the at least one male screw thread is located along the distal end of the mutual rotational axis beyond the base, and wherein the at least one male screw thread is located along the distal end of the mutual rotational axis at an adjustable spaced distance from the extent of the cutting member.

5. The tool as recited in claim 1, wherein the tool is fabricated from a single piece of a material.

6. The tool as recited in claim 1, wherein the tool is assembled from at least two separate pieces adapted to fit together.

7. The tool as recited in claim 1, wherein the at least one cutting bit is at least one saw tooth.

8. The tool as recited in claim 1, wherein the at least one cutting bit is at least one grit particle, wherein the at least one grit particle is fixed to an edge of the cutting member.

9. A tool for cutting a circular opening and retaining the cut portion, comprising:
   a shaft having a distal end and a proximal end, wherein the shaft has at least one cutting thread and at least one male screw thread, wherein the at least one cutting thread and the at least one male screw thread are along the distal end; and
   a cutting member having a distal portion and a proximal portion, wherein the cutting member has at least one cutting bit radially displaced from the shaft, wherein the shaft and the cutting member have a mutual rotational axis, wherein the cutting member has a base at the proximal portion where the cutting member connects with the shaft along the proximal end, wherein the at least one cutting bit is located at the distal portion of the cutting member, and wherein the at least one cutting thread and each of the at least one male screw thread are located along the distal end of the shaft an adjustable spaced distance beyond the extent of the distal portion of the cutting member.

10. A tool for cutting a circular opening and retaining the cut portion, comprising:
    a shaft having at least one male screw thread, wherein the shaft has a distal end and a proximal end; and
    a cutting member having at least one grit particle radially displaced from the shaft, wherein the shaft and the cutting member have a mutual rotational axis, wherein the cutting member has a base where the cutting member connects with the shaft along the proximal end, wherein the at least one grit particle is fixed to an edge of the cutting member and is located at the distal end of the cutting member, wherein the at least one male screw thread is located along the distal end of the mutual rotational axis beyond the base, and wherein the at least one male screw thread is located along the distal end of the mutual rotational axis at an adjustable spaced distance from the extent of the cutting member.

11. A method for cutting a circular opening and retaining the cut portion, comprising:
rotatably inserting at least one male screw thread on a shaft into a pilot hole in a workpiece; and
maintaining the shaft within the pilot hole while rotatably extending a cutting member of circular cross section greater than the pilot hole through the workpiece;
wherein said rotatably inserting extends the at least one male screw thread entirely through the workpiece, and
wherein said maintaining comprises securing the inner diameter of the pilot hole against an outer surface of the shaft axially spaced from the at least one male screw thread, wherein the at least one male screw thread is on one side of the workpiece while the cutting member is on the opposite side of the workpiece just before the cutting member extends through the workpiece.

12. The method as recited in claim 11, wherein said rotatably inserting, said maintaining, and said rotatably extending occur in one continuous stroke while sustaining rotational motion.

13. The tool as recited in claim 9, wherein the tool is fabricated from a single piece of a material.

14. The tool as recited in claim 9, wherein the tool is assembled from at least two separate pieces adapted to fit together.

15. The tool as recited in claim 9, wherein the at least one cutting bit is at least one saw tooth.

16. The tool as recited in claim 9, wherein the at least one cutting bit is at least one grit particle, wherein the at least one grit particle is fixed to an edge of the cutting member.

17. A tool for cutting a circular opening and retaining the cut portion, comprising:
a shaft having a distal end and a proximal end, wherein the shaft has at least one tapping thread along the distal end; and
a cutting member having a distal portion and a proximal portion, wherein the cutting member has at least one cutting bit along the distal portion, wherein the cutting bit is radially displaced from the shaft, wherein the shaft and the cutting member have a mutual rotational axis, and wherein the at least one tapping thread extends an adjustable spaced distance along the shaft beyond the extent of the distal portion of the cutting member.

18. The method as recited in claim 11, wherein said rotatably inserting, said maintaining, and said rotatably extending occur with at least one cease of rotation.

19. A method for cutting a circular opening and retaining the cut portion, comprising:
rotatably inserting at least one tapping thread on a shaft into a pilot hole in a workpiece to form at least one female screw thread in the pilot hole; and
maintaining the shaft within the pilot hole while rotatably extending a cutting member of circular cross section greater than the pilot hole through the workpiece, wherein the at least one tapping thread extends an adjustable spaced distance along the distal end of the shaft beyond the extent of the distal portion of the cutting member.

20. The method as recited in claim 19,
wherein said rotatably inserting extends the at least one tapping thread entirely through the workpiece, and
wherein said maintaining comprises securing the inner diameter of the pilot hole against an outer surface of the shaft axially spaced from the at least one tapping thread.

21. The tool as recited in claim 17, wherein the tool is fabricated from a single piece of a material.

22. The tool as recited in claim 17, wherein the tool is assembled from at least two separate pieces adapted to fit together.

23. The tool as recited in claim 17, wherein the at least one cutting bit is at least one saw tooth.

24. The tool as recited in claim 17, wherein the at least one cutting bit is at least one grit particle, wherein the at least one grit particle is fixed to an edge of the cutting member.

25. A tool for cutting a circular opening and retaining the cut portion, comprising:
a shaft having a distal end and a proximal end, wherein the shaft has at least one male screw thread along the distal end; and
a cutting member having a distal portion and a proximal portion, wherein the cutting member has at least one cutting bit along the distal portion, wherein the cutting bit is radially displaced from the shaft, wherein the shaft and the cutting member have a mutual rotational axis, wherein the cutting member has a base at the proximal portion where the cutting member connects with the shaft along the proximal end, wherein the at least one cutting bit is located at the distal portion of the cutting member, and wherein each of the at least one male screw thread is located along the distal end of the shaft an adjustable spaced distance from the extent of the distal portion of the cutting member.

26. The method as recited in claim 19, wherein said rotatably inserting, said maintaining, and said rotatably extending occur in one continuous stroke while sustaining rotational motion.

27. The method as recited in claim 19, wherein said rotatably inserting, said maintaining, and said rotatable extending occur with at least one cease of rotation, and wherein the rotational direction is reversed at least once when the at least one cease of rotation occurs.

28. A method for cutting a circular opening and retaining the cut portion, comprising:
rotatably inserting at least one cutting thread and at least one male screw thread located along the distal end of a shaft entirely through a workpiece to form a pilot hole having at least one female screw thread; and
maintaining the shaft within the pilot hole while rotatably extending a cutting member of circular cross section greater than the pilot hole through the workpiece, wherein each of the at least one male screw thread extends an adjustable spaced distance along the distal end of the shaft beyond the extent of the distal portion of the cutting member.

29. The tool as recited in claim 25, wherein the tool is fabricated from a single piece of a material.

30. The tool as recited in claim 25, wherein the tool is assembled from at least two separate pieces adapted to fit together.

31. The tool as recited in claim 25, wherein the at least one cutting bit is at least one saw tooth.

32. The tool as recited in claim 25, wherein the at least one cutting bit is at least one grit particle, wherein the at least one grit particle is fixed to an edge of the cutting member.

33. A tool for cutting a circular opening and retaining the cut portion, comprising:
   a shaft having a cutting tip and at least one tapping thread; and
   a cutting member having at least one cutting bit radially displaced from the shaft, wherein the shaft and the cutting member have a mutual rotational axis, and wherein the at least one tapping thread extends an adjustable spaced distance along the shaft from the cutting member.

34. The method as recited in claim 28, wherein said rotatable inserting, said maintaining, and said rotatable extending occur with at least one cease of rotation, and wherein the rotational direction is reversed at least once when the at least one cease of rotation occurs.

35. The method as recited in claim 28, wherein said maintaining comprises securing the inner diameter of the pilot hole against an outer surface of the shaft axially spaced from the at least one male screw thread, wherein the at least one male screw thread is on one side of the workpiece while the cutting member is on the opposite side of the workpiece just before the cutting member extends through the workpiece.

36. The method as recited in claim 28, wherein said rotatably inserting, said maintaining, and said rotatably extending occur in one continuous stroke while sustaining rotational motion.

37. The tool as recited in claim 33, wherein the tool is fabricated from a single piece of a material.

38. The tool as recited in claim 33, wherein the tool is assembled from at least two separate pieces adapted to fit together.

39. The tool as recited in claim 33, wherein the at least one cutting bit is at least one saw tooth.

40. The tool as recited in claim 33, wherein the at least one cutting bit is at least one grit particle, wherein the at least one grit particle is fixed to an edge of the cutting member.

41. A tool for cutting a circular opening and retaining the cut portion, comprising:
   a shaft having a distal end and a proximal end, wherein the shaft has a cutting tip and at least one male screw thread, and wherein the at least one cutting tip and the at least one male screw thread are along the distal end; and
   a cutting member having a distal portion and a proximal portion, wherein the cutting member has at least one cutting bit radially displaced from the shaft, wherein the shaft and the cutting member have a mutual rotational axis, wherein the cutting member has a base at the proximal portion where the cutting member connects with the shaft along the proximal end, wherein the at least one cutting bit is located at the distal portion of the cutting member, and wherein the cutting tip and each of the at least one male screw thread are located along the distal end of the shaft an adjustable spaced distance from the extent of the distal portion of the cutting member.

42. A method for cutting a circular opening and retaining the cut portion, comprising:
   rotatably inserting at least one cutting thread and at least one tapping thread located along the distal end of a shaft entirely through a workpiece to form a pilot hole having at least one female screw thread; and
   maintaining the shaft within the pilot hole while rotatably extending a cutting member of circular cross section greater than the pilot hole through the workpiece, wherein the at least one tapping thread extends an adjustable spaced distance along the distal end of the shaft beyond the extent of the distal portion of the cutting member.

43. A tool for cutting a circular opening and retaining the cut portion, comprising:
   a shaft having a cutting tip and at least one male screw thread, wherein the shaft has a distal end and a proximal end; and
   a cutting member having at least one saw tooth radially displaced from the shaft, wherein the shaft and the cutting member have a mutual rotational axis, wherein the cutting member has a base where the cutting member connects with the shaft along the proximal end, wherein the at least one saw tooth is located at the distal end of the cutting member, wherein the cutting tip and the at least one male screw thread are located along the distal end of the mutual rotational axis beyond the base, and wherein the cutting tip and the at least one male screw thread are located along the distal end of the mutual rotational axis at an adjustable spaced distance from the extent of the cutting member.

44. A tool for cutting a circular opening and retaining the cut portion, comprising:
   a shaft having a cutting tip and at least one male screw thread, wherein the shaft has a distal end and a proximal end; and
   a cutting member having at least one grit particle radially displaced from the shaft, wherein the shaft and the cutting member have a mutual rotational axis, wherein the cutting member has a base where the cutting member connects with the shaft along the proximal end, wherein the at least one grit particle is fixed to an edge of the cutting member and located at the distal end of the cutting member, wherein the cutting tip and the at least one male screw thread are located along the distal end of the mutual rotational axis beyond the base, and wherein the cutting tip and the at least one male screw thread are located along the distal end of the mutual rotational axis at an adjustable spaced distance from the extent of the cutting member.

45. The tool as recited in claim 41, wherein the tool is fabricated from a single piece of a material.

46. The tool as recited in claim 41, wherein the tool is assembled from at least two separate pieces adapted to fit together.

47. The tool as recited in claim 41, wherein the at least one cutting bit is at least one saw tooth.

48. The tool as recited in claim 41, wherein the at least one cutting bit is at least one grit particle, wherein the at least one grit particle is fixed to an edge of the cutting member.

49. The method as recited in claim 42, wherein said rotatable inserting, said maintaining, and said rotatably extending occur with at least one cease of rotation, and wherein the rotational direction is reversed at least once when the at least one cease of rotation occurs.

50. The method as recited in claim 42, wherein said maintaining comprises securing the inner diameter of the pilot hole against an outer surface of the shaft axially spaced from the at least one tapping thread.

51. The method as recited in claim 42, wherein said rotatably inserting, said maintaining, and said rotatably extending occur in one continuous stroke while sustaining rotational motion.

52. The method as recited in claim 18, wherein the rotational direction is reversed at least once when the at least one cease of rotation occurs.

* * * * *

UNITED STATES PATENT AND TRADEMARK OFFICE
CERTIFICATE OF CORRECTION

PATENT NO. : 6,206,616 B1
DATED : March 27, 2001
INVENTOR(S) : Smith et al.

It is certified that error appears in the above-identified patent and that said Letters Patent is hereby corrected as shown below:

Column 15, claimn 34,
Line 12, before the phrase "inserting, said maintaining," please delete the word "rotatable" and substitute therefor -- rotatably --.
Line 12, after the phrase " and said" please delete the word "rotatable" and substitute therefor -- rotatably --.

Column 16, claim 49,
Line 51, after the phrase "inserting, said maintaining," please delete the word "rotatable" and subdtitute therefor -- rotatably --.

Column 16, claim 51,
Line 51, after the phrase "extending occur" please delete "in one continuous stroke while sustaining rotation motion" and substitute therefor -- with at lease one cease of rotation, and wherein the rotational direction is reversed at least once when the at least one cease of rotatin occurs --.

Signed and Sealed this

Twentieth Day of November, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,206,616 B1
DATED : March 27, 2001
INVENTOR(S) : Smith et al.

It is certified that error appears in the above-identified patent and that said Letters Patent is hereby corrected as shown below:

Column 15, claim 34,
Line 12, before the phrase "inserting, said maintaining," please delete the word "rotatable" and substitute therefor -- rotatably --.
Line 12, after the phrase " and said" please delete the word "rotatable" and substitute therefor -- rotatably --.

Column 16, claim 49,
Line 51, after the phrase "inserting, said maintaining," please delete the word "rotatable" and substitute therefor -- rotatably --.

Column 16, claim 51,
Line 51, after the phrase "extending occur" please delete "in one continuous stroke while sustaining rotation motion" and substitute therefor -- with at least one cease of rotation, and wherein the rotational direction is reversed at least once when the at least one cease of rotation occurs --.

This certificate supersedes Certificate of Correction issued November 20, 2001

Signed and Sealed this

Nineteenth Day of February, 2002

*Attest:*

JAMES E. ROGAN
*Attesting Officer*    *Director of the United States Patent and Trademark Office*